(12) United States Patent
Kawamoto et al.

(10) Patent No.: US 7,254,160 B2
(45) Date of Patent: Aug. 7, 2007

(54) RADIO RECEIVER

(75) Inventors: Kiyoshi Kawamoto, Yokohama (JP); Manabu Kawabe, Hachioji (JP); Shiro Mazawa, Yokohama (JP); Tomoyuki Ono, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 730 days.

(21) Appl. No.: 10/366,492

(22) Filed: Feb. 12, 2003

(65) Prior Publication Data
US 2003/0235240 A1    Dec. 25, 2003

(30) Foreign Application Priority Data
Mar. 20, 2002    (JP)    ................ 2002-077495

(51) Int. Cl.
*H04B 1/707*    (2006.01)

(52) U.S. Cl. ...................... 375/148; 375/150

(58) Field of Classification Search ................ 375/148, 375/150, 142, 343, 209, 210
See application file for complete search history.

(56) References Cited

U.S. PATENT DOCUMENTS
5,442,627 A    8/1995    Viterbi et al.

*Primary Examiner*—Mohammed Ghayour
*Assistant Examiner*—Lawrence Williams
(74) *Attorney, Agent, or Firm*—Townsend and Townsend and Crew LLP

(57) ABSTRACT

A radio receiver handles a transmitted Walsh sequence having a code length of "m" as a two-dimensional array of "a" rows and "b" columns, and performs a fast Hadamard transform process having a code length of "a" in the row direction. The absolute values of the results are added in the column direction, and a Walsh number having the maximum receiving power is selected to determine a Walsh sequence having a code length of "a." Then, only the identified column is extracted, and a fast Hadamard transform process having a code length of "b" is applied in the column direction.

15 Claims, 15 Drawing Sheets

Bi-orthogonal encode Process

| DRC Symbol | Codeword |
|---|---|
| 0x0 | 00000000 |
| 0x1 | 11111111 |
| 0x2 | 01010101 |
| 0x3 | 10101010 |
| 0x4 | 00110011 |
| 0x5 | 11001100 |
| 0x6 | 01100110 |
| 0x7 | 10011001 |
| 0x8 | 00001111 |
| 0x9 | 11110000 |
| 0xA | 01011010 |
| 0xB | 10100101 |
| 0xC | 00111100 |
| 0xD | 11000011 |
| 0xE | 01101001 |
| 0xF | 10010110 |

Fig. 13

RADIO RECEIVER

The present application claims priority from Japanese Application No. JP2002-077495, filed Mar. 20, 2003.

BACKGROUND OF THE INVENTION

The present invention relates to a code division multiple access (CDMA) transmission technique, and more particularly to, a modulation technique for a case in which a Walsh sequence having a relatively long code length is used, such as an m-ary modulation, in a radio receiver.

The CDMA transmission technique is one of multiple access communication techniques used for sharing a limited frequency band by a plurality of users, and is known for a high frequency-utilization efficiency compared with time division multiple access (TDMA) and frequency division multiple access (FDMA) transmission techniques. In CDMA, data obtained after modulation is multiplied by a pseudo-random code called a PN code and is transmitted. The multiplication process by the PN code is called spreading, and has an important role of identifying the user in CDMA. The PN code has a sufficiently high transmission rate (approximately 100 to 1000 times) compared with the bit rate of generally transmitted information. Therefore, by performing the spreading process, the bandwidth of a transmission signal is extended to 100 to 1000 times that obtained before the spreading process. In the PN code, since a different code sequence is used for each user, a multiplication process by the same PN sequence as in the transmission side is performed in a demodulation process. This is called a despreading process. The despreading process by the same code sequence as in the transmission side is performed to regenerate the original information bit. In this case, whether the information bit is "1" or "0" is determined by calculating a correlation with a spreading code. This is because calculating the correlation reduces the effect of user signals having different code sequences, and allows only a signal having the same code sequence to be extracted.

The ratio of the spreading-code rate to the information-bit rate is called the processing gain. In CDMA, the larger the processing gain is, the better the communication. Therefore, to improve communication quality in CDMA, it is necessary to increase the spreading-code rate or to reduce the transmission-data rate. In the m-ary modulation technique, the processing gain can be increased without reducing the transmission-data rate. With this characteristic, m-ary modulation is frequently used in CDMA communications.

In EIA/TIA/IS-95A (hereinafter called IS-95A) known as "cdmaOne," 64-ary modulation using a code length of 64 is used in a reverse link (transmission at a mobile station and receiving at a base station). The 64-ary demodulation method used in IS-95A is described in detail in U.S. Pat. No. 5,442,627, "Noncoherent Receiver Employing a Dual Maxima Metric Generation Process" by Audrey Viterbi and Andrew J. Viterbi. Since a pilot channel is not transmitted in the reverse link of IS-95A, it is difficult to perform synchronous detection for estimating the phase of a signal during demodulation. Therefore, U.S. Pat. No. 5,442,627 shows a structure used in a case in which demodulation is performed by asynchronous detection, where phase estimation is not performed. In this case, to demodulate a signal to which 64-ary modulation has been applied, an Hadamard transform is first applied to an I phase and a Q phase, and then the correlation between the received signal and 64 Walsh code sequences is calculated. The data obtained by correlation is converted to electric power by calculating the sums of squares of the I-phase component and the Q-phase component. The electric power is compared with that of each Walsh code to determine the Walsh code having the maximum value to determined the transmitted Walsh code.

SUMMARY OF THE INVENTION

In modulation techniques using a Walsh code, such as m-ary modulation, correlation with all Walsh codes needs to be obtained, and therefore, the amount of processing becomes huge as "m" increases. The number of additions and subtractions is the second power of "m" when a fast Hadamard transform (FHT) process is not performed. When the FHT process is performed, the number of additions and subtractions is $m*\log_2 m$. In IS-95A, where "m" is set to 64, the number of additions and subtractions is $64*\log_2 64$, that is, 384, even when the FHT processing is performed. In addition, comparison calculations for determining the maximum value are performed $64-1=63$ times, and, in a case in which asynchronous detection is performed such as in IS-95A, electric-power synthesis for the I and Q channels is performed 64 times.

To perform all of these processes by hardware, it is necessary for the hardware to have a size in proportion to the total number of times the calculations are performed. Since a base station in a CDMA system needs to demodulate signals received from a plurality of terminals, the above-described calculations are performed for each of the plurality of terminals. When there are three sectors and 30 terminals are connected in each sector, for example, the required processing is 3 multiplied by 30, that is, 90 times the above-described calculations. Since the above-described processes occupy a large part in demodulation at the base station, simplifying the processes reduces the hardware/software of a receiver used in the base station.

As a way to reduce the amount of calculations in the FHT process, a Walsh code sequence having a long code sequence is expressed by the product of Walsh code sequences having a short code length. For example, a Walsh code 64 bits long can be expressed by the product of two Walsh codes each having a length of eight bits because $64=8\times 8$.

It is required that $\log_2 m = \log_2 a + \log_2 b$, where "m" indicates the code length of the original Walsh code sequence, and "a" and "b" indicate the code lengths of Walsh code sequences used to express the original Walsh code sequence by their product.

FIG. 4 shows a case in which a Walsh code indicated by the following expression (1) is expressed by two Walsh codes each having a length of eight bits.

$$W_{31}^{64} \quad (1)$$

The foregoing expression (1) indicates the 31st element of a 64-bit Walsh code which is expressed in binary by a code sequence {0110 1001 1001 0110 1001 0110 0110 1001 0110 1001 1001 0110 1001 0110 0110 1001} by referring to FIG. 4. Since $31=\{011111\}b$, the original data symbol can be divided into former three bits and latter three bits and expressed by the following expression (2).

$$W_{31}^{64} = W_3^8 W_7^8 \quad (2)$$

In other words, the Walsh code 64 bits long can be expressed by a two-dimensional array generated by multiplying each bit of the former 8-bit Walsh code by the latter 8-bit Walsh code. All elements are connected in series to generate the 64-bit Walsh code.

A method for decoding the code will be described by referring to FIG. 5. A receiving side decodes a code sequence having a long code length by regarding it as a two-dimensional array of code sequences having a short code length. In the case shown in FIG. 5, the FHT processing is first applied to the sequences of the two-dimensional array in the horizontal direction. A noise component is added in an actual transmission path before demodulation, but noise is not considered here for the sake of simplicity. It is understood that the electric power converges at the position of the following expression as a result of the FHT processing applied in the horizontal direction.

$$W_7^8 \qquad (3)$$

Then, the absolute values thereof are added in the vertical direction and the maximum value is selected to determine the Walsh code multiplied in the horizontal direction. The FHT process is applied only to the selected portion in the vertical direction to determine the Walsh code used in the transmission source. In this case, the foregoing expression (3) is determined from the result of the FHT process applied in the horizontal direction and the following expression (4) is determined from the result of the FHT process applied in the vertical direction.

$$W_3^8 \qquad (4)$$

Therefore, it is found that the transmitted Walsh code is expressed by expression (2). Then, when the Walsh numbers are converted to transmission-data symbols, {011}b, {111}b={011111}b and it is understood that demodulation to the transmission-data symbols is correctly performed.

The amount of calculation is:
  Additions and subtractions: $8*8*\log_2 8 + 8*\log_2 8 = 216$ (conventionally 384)
  Absolute-value additions: $8*8=64$ (conventionally 0)
  Square additions (only for asynchronous detection): 8 (conventionally 64)
  Comparison calculations: $(8-1)+(8-1)=14$ (conventionally 63)

where, the first term in the additions and subtractions indicates the FHT process applied in the horizontal direction, the second term therein indicates the FHT process applied in the vertical direction, the first term in the comparison calculations indicates comparisons for determining the Walsh code applied in the horizontal direction, and the second term therein indicates comparisons for determining the Walsh code applied in the vertical direction.

It is understood that the large amount of calculations conventionally required is reduced in the additions and subtractions, the square additions, and the comparison calculations although some new absolute-value additions are required, compared with the conventional method. This effect becomes prominent as the code length "m" increases.

Since the number of FHT processes required depends on the code length in the conventional method, when the code length becomes long, accordingly the amount of processing becomes huge. In the present invention, a long code is regarded as a two-dimensional array. Therefore, the load of the FHT process is reduced, thus realizing fast processing. It is also easy to perform the FHT process by hardware and software such that the process is divided into two stages, the hardware handles the first FHT-processing stage applied in the horizontal direction and the software performs the second FHT-processing stage applied in the vertical direction by using a DSP after the Walsh code in the horizontal direction is determined.

A description has been made so far in which a long Walsh sequence is regarded as the product of a plurality of Walsh sequences, and the FHT processing is applied to the plurality of Walsh sequences to reduce the amount of calculation. In the present demodulation method, however, since absolute-value additions are used in the first Walsh code determination, the electric power of noise is all converted to a positive value and added, so that the characteristic deteriorates slightly.

FIG. 6 shows a measure for improving the present technique. The FHT processing is applied in the horizontal direction, and then, absolute-value additions are performed. These are the same as in the above-described method, however, instead of determining only one Walsh code in the vertical direction, a plurality of Walsh-code candidates are selected in the descending order of electric power. When the total number of candidates is "b" and the number of selected candidates is "n", $2 \leq n \leq b$. When "b" is equal to "n", the condition is equivalent to a case in which the FHT process is ideally performed.

Then, the FHT process is applied only to n selected candidates in the vertical direction. It is determined in the result of the FHT process applied in the vertical direction that the transmitted Walsh code has the maximum electric power.

The amount of calculations in this case is:
  Additions and subtractions: $8*\log_2 8 + n*8*\log_2 8$
  Absolute-value additions: $8*8$
  Square additions (only for asynchronous detection): $n*8$
  Comparison calculations: $(8-n)*n+8*(n-1)$ where, the first term in additions and subtractions indicates the FHT process applied in the horizontal direction, the second term therein indicates absolute-value additions, the first term in comparison calculations indicates comparisons for determining the Walsh code applied in the horizontal direction, and the second term therein indicates comparison for determining the Walsh code applied in the vertical direction.

When "n" is changed, the number of additions and subtractions is reduced at $n \leq 5$ when m=64. The number of comparison calculations is reduced irrespective of the value of "n". Since it is expected that the demodulation characteristic will be better when the number of candidates is increased, it is possible to obtain "n" which satisfies the lowest usable characteristic while the amount of calculation is suppressed to the minimum level.

FIG. 7 shows the results of simulation of a demodulation characteristic in a case in which the number of candidates is changed. In FIG. 7, the horizontal axis indicates SIR obtained before the first FHT process is performed, and the vertical axis indicates the error probability after a Walsh demodulation process. According to these results, it is understood that a deterioration of slightly less than 1 dB occurs when the number "n" of candidates is set to one, compared with the ideal demodulation method, but an almost ideal characteristic is obtained when "n" is set to two or more;

BRIEF DESCRIPTION OF THE DRAWINGS

FIG. 9 is a block diagram showing the structure of a receiving system in a base station transceiver subsystem in a reverse link of IS-95a.

FIG. 13 is a view showing a bi-orthogonal encoding method.

DESCRIPTION OF THE PREFERRED EMBODIMENTS

First Embodiment

Figure 8:
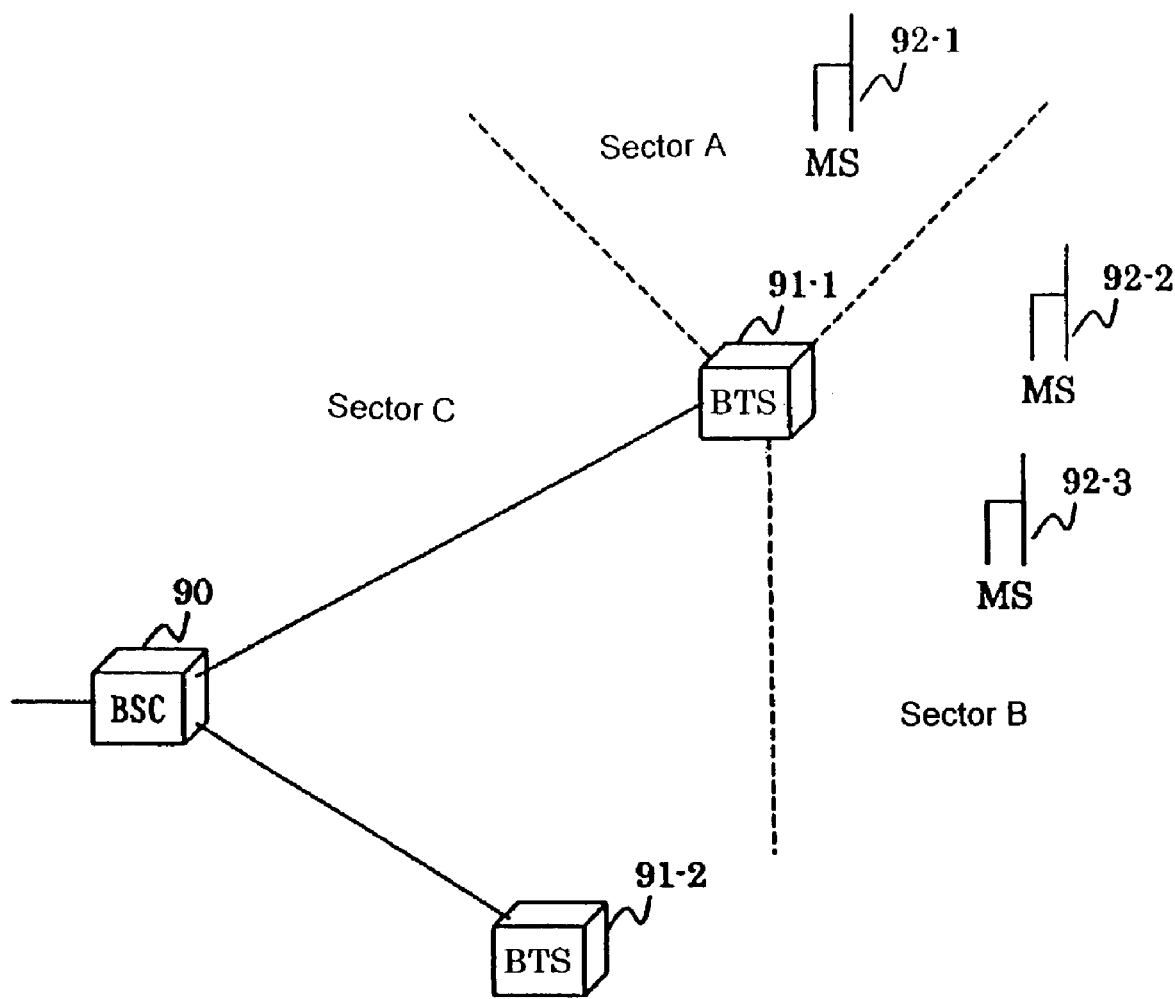
FIG. 8 is a view showing the structure of an entire CDMA system.

FIG. 8 is a view showing the overall configuration of a CDMA-system. The CDMA system includes a plurality of mobile stations (MSs) 92-1 to 92-3, a plurality of base station transceiver subsystems (BTSs) 91-1 to 91-2 communicating with the plurality of mobile stations 92-1 to 92-3 by radio, a base station controller (BSC) 90 for controlling the plurality of base station transceiver subsystems (BTSs) 91-1 to 91-2, and units (not shown), such as an exchange, connected to the base station controller (BSC) 90.

In the CDMA system, in order to increase the subscriber capacity which can be handled by one base station transceiver subsystem, the space is divided by using directional antennas to form areas called sectors. For example, when three sectors are formed by using 120-degree directional antennas, the capacity of one base station transceiver subsystem is increased to approximately three times the capacity obtained in a case in which nondirectional antennas are used for sector division. As described above, in the CDMA system, since a unique PN code is allocated to every user to share time and frequency, the spreading code length of one symbol needs to be increased in order to increase the number of multiplexed signals per one carrier frequency. In the CDMA system, m-ary modulation is used to increase the spreading code length of one symbol. 64-ary modulation which uses a Walsh code having a code length of 64 is used in IS-95A. A Walsh code having a longer code is expected to be used in the future as means for further increasing the number of multiplexed signals.

Figure 1:
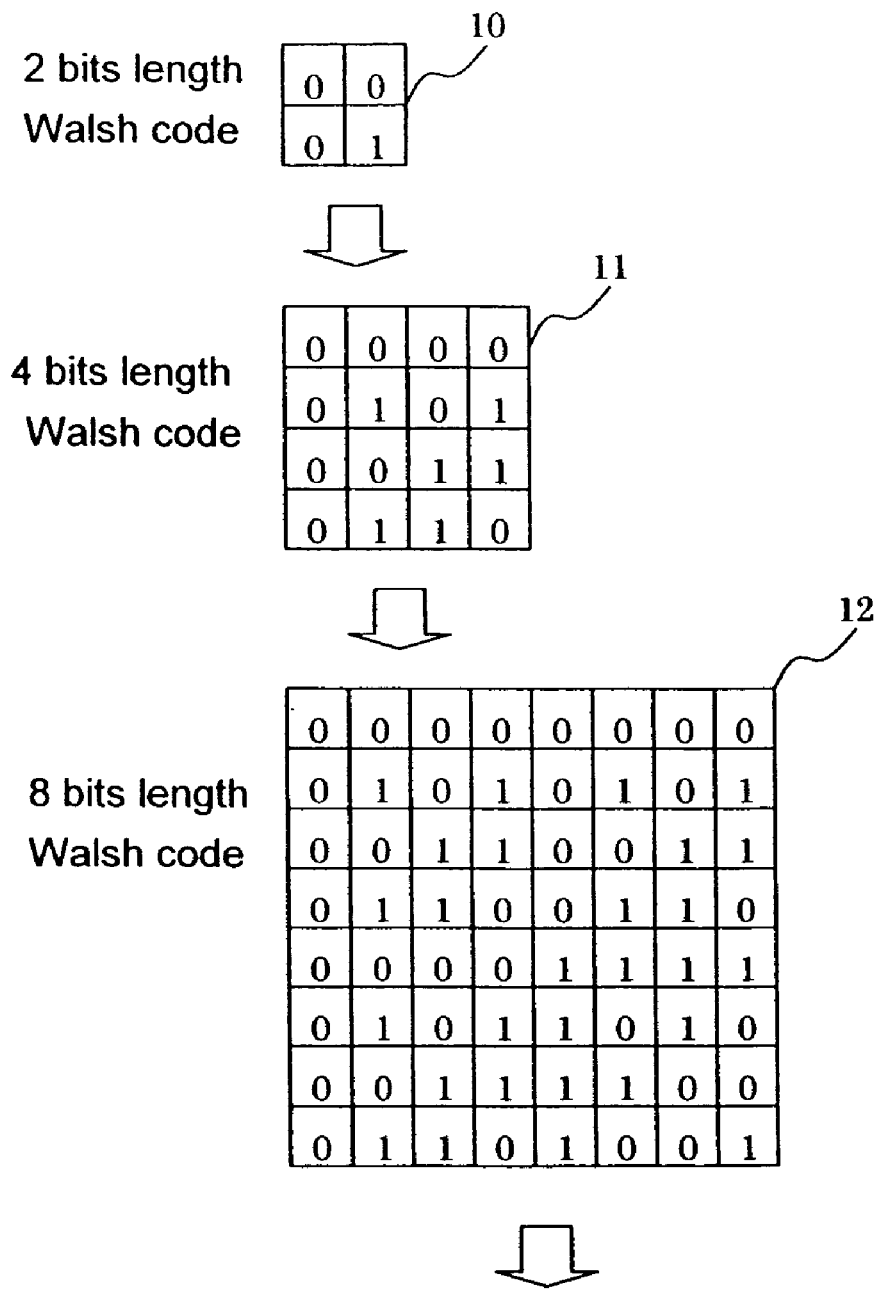
FIG. 1 is a view showing a Walsh-code generation method.

The m-ary modulation and demodulation method used in CDMA communication will be described below. In the m-ary modulation, a plurality of data symbols to be sent is replaced with one Walsh code and is transmitted. The Walsh code is one type of orthogonal codes and is generated by a method shown in FIG. 1. The minimum unit of the Walsh code is a two-bit code, "00" or "01". Orthogonal codes means that the number of bits which match and the number of bits which do not match are equal between the two codes. In this case, the cross correlation between the two codes is zero and these codes do not interfere with each other. Since the Walsh code has a code length of $2^n$, the Walsh code is expressed by the following expression (5):

$$W_m^n \tag{5}$$

where, a number "n" at the upper right means the Walsh code length, and a number "m" at the lower right means the Walsh number. For example, the following expression (6)

$$W_2^8 \tag{6}$$

includes a second Walsh code having eight bits, which is {01010101} by referring to FIG. 1. As described above, in the m-ary modulation, a plurality of symbols is replaced with the Walsh code and transmitted. The letter "m" indicates the length of the Walsh code. Now, 8-ary modulation will be described by referring to FIG. 2. Since "m" is eight in 8-ary modulation, an eight-bit Walsh code is used. Therefore, as shown in the following expression (7), one Walsh code is allocated to three bits of a transmission-data symbol.

$$8=2^3 \tag{7}$$

More specifically, the modulating process is performed with eight data-symbol bits corresponding to eight Walsh codes. In the example shown in FIG. 2, three-bit information "100", is converted to a Walsh code of {00001111} at an m-ary modulator 21 and then transmitted.

Figure 2:
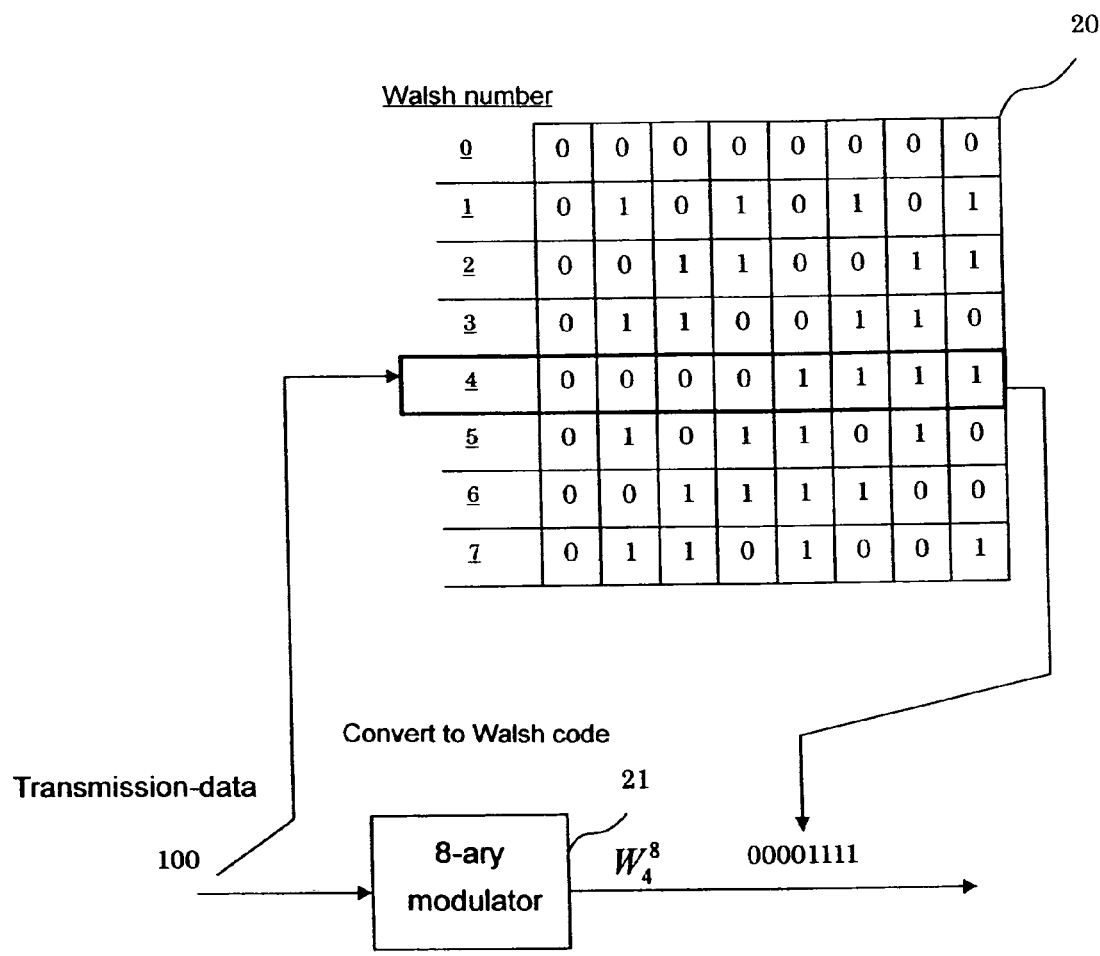
FIG. 2 is a view showing an m-ary modulation method for a code length of eight.

A method for demodulating, at a receiving side, modulated data which is transmitted in this manner will be described using FIG. 3. The receiving side cannot identify which Walsh code has been transmitted. Therefore, correlation with all Walsh codes are calculated to determine which Walsh code has been transmitted. In the example of FIG. 2, the Walsh code shown in the following expression (8) is transmitted, so that the result of correlation with the Walsh code is eight and the results of correlation with the other Walsh codes are zero.

$$W_4^8 \tag{8}$$

Although a noise component is added to the received data in practice, correlation with all Walsh codes is calculated and the code having the maximum correlation value is selected. It is most likely that the code is the Walsh code which has been transmitted. Thus, the receiving side can identify the transmitted Walsh code and converts the identified Walsh code to the original data symbol to complete the demodulating process. The process of calculating the correlation with all Walsh codes at the demodulating section can be simplified by a fast Hadamard transform (hereinafter referred to as FHT) process.

Figure 3:
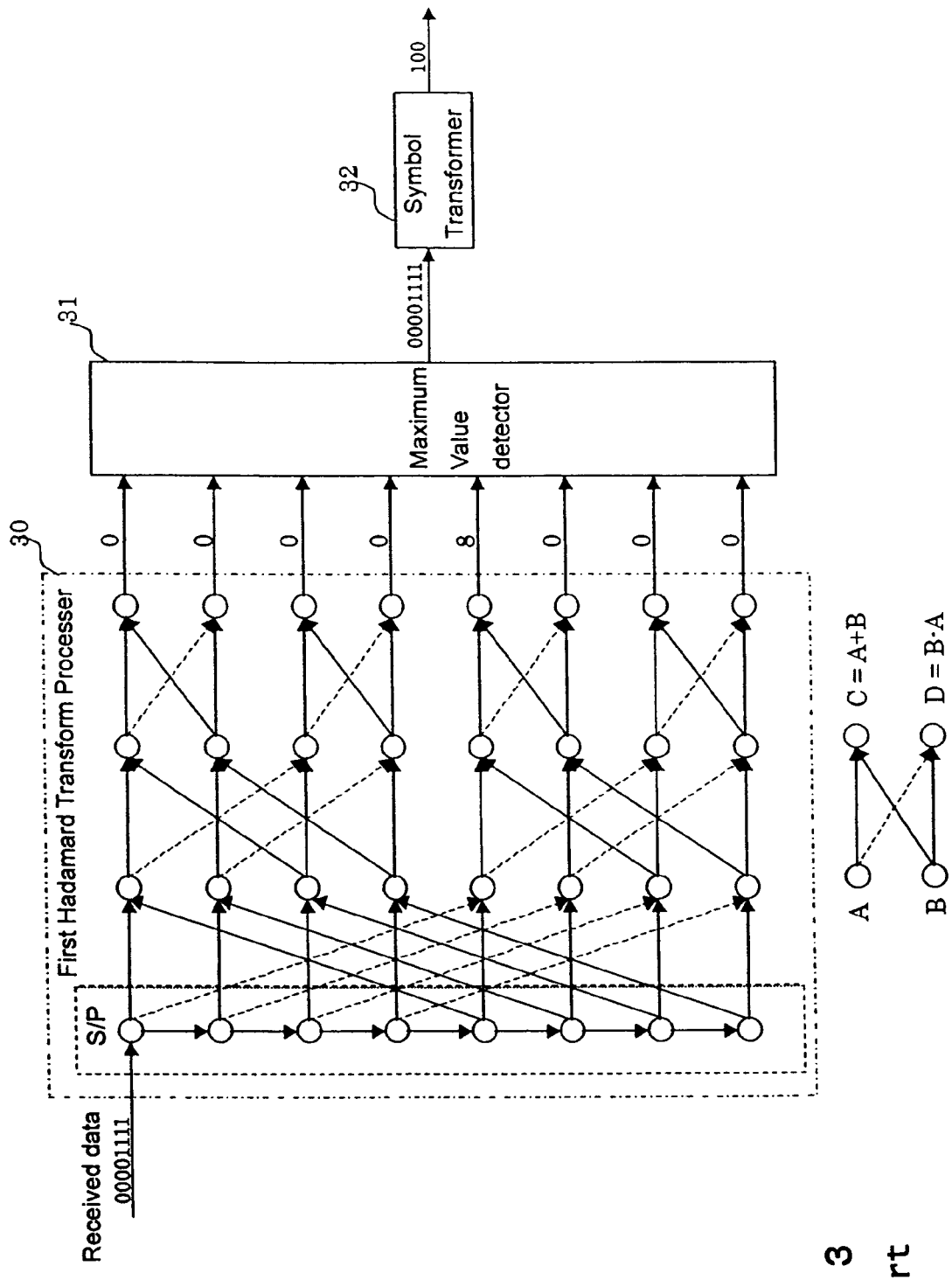
FIG. 3 is a view showing an m-ary demodulation method for a code length of eight.
Figure 4:
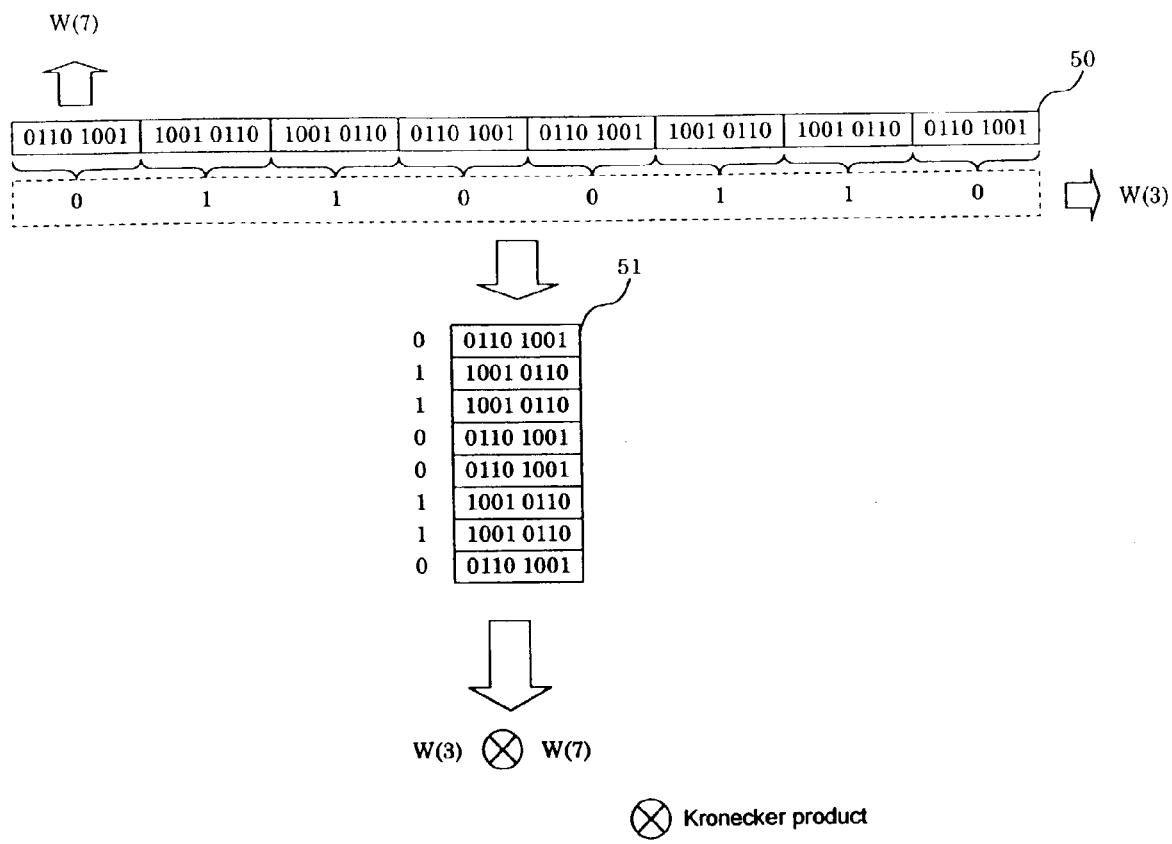
FIG. 4 is a view showing a method for converting a Walsh code to a two-dimensional array.

FIG. 3 shows the configuration of an 8-ary demodulator used in a case when the FHT process is used. The FHT process is known as a technique for performing the Walsh decoding process at a high speed by butterfly computation. In FIG. 3, each circle on and after the second column shows an adder/subtracter. In each adder/subtracter, an addition process is applied to data input from the left horizontally and data input from the lower left to the upper right, and a subtraction process is applied to data input from the left horizontally and data input from the upper left to the lower right. By repeating this process three times, each calculation unit (adder/subtracter) outputs the same results as those obtained when correlation with the Walsh codes having the Walsh numbers 0 to 7 is calculated. A Walsh code is selected by the determination of the maximum value, applied to the outputs of the calculation units (adder/subtracter), and the original data sequence is obtained. By performing the FHT process, the calculation process for obtaining correlation with each Walsh code can be simplified.

Figure 9:
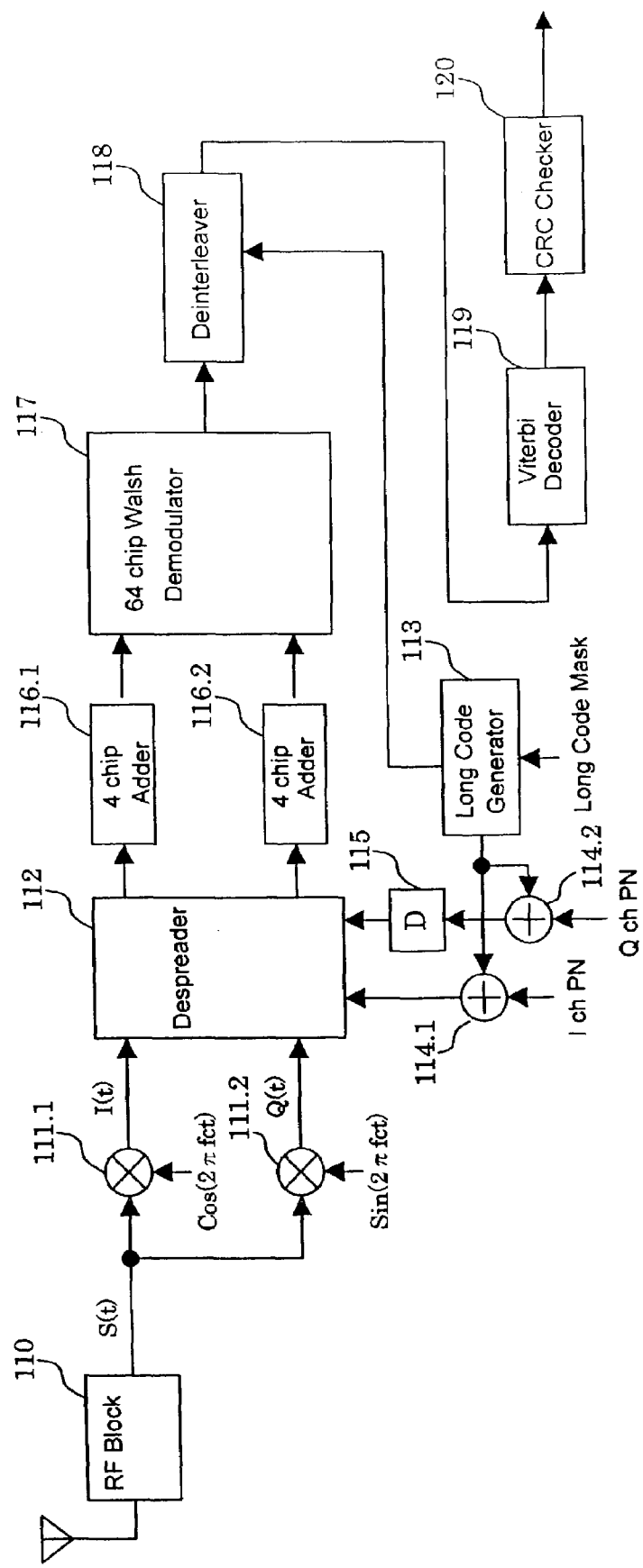

FIG. 9 shows the configuration of a receiving system which uses 64-ary modulation of a base station transceiver subsystem in IS-95A. A signal received at the base station transceiver subsystem is first amplified in power and converted in frequency by a radio frequency block 110, and is then multiplied by a local signal having a phase difference of 90 degree by multipliers 111-1 and 111-2 to be converted to base band signals I(t) and Q(t). The base band signals are despread by PM and PNQ having the same code sequence as in the transmission side. Since these PN codes differ in each user, the base station transceiver subsystem needs to perform despreading and subsequent processes for the maximum number of users which one base station transceiver subsystem supports. Therefore, a receiver in a base station transceiver subsystem distributes base band signals obtained after I and Q conversions to a plurality of base band signal processors which perform the demodulating process and which are provided corresponding to all users to perform despreading and the subsequent processes for every user in parallel.

In a despreader 112, the base band signals are multiplied by PNI and PNQ, having the same code sequence as in the transmission side, for every user to reproduce the pre-spreading signals. Further, in four-chip adders 116-1 and 116-2, correlation of the signals is calculated for one Walsh chip, which equals four PN chips, and is then sent to a 64 chip Walsh demodulator 117. A 64-ary demodulating process can be simplified by applying the present invention: this will be described later.

A reverse operation of a re-arrangement process performed by an interleaver in the transmission side is applied to the received data obtained after the 64-ary demodulating process by a deinterleaver 118 to be converted back to the original transmission sequence. In a case of a low transmission rate, since data is transmitted in a burst mode by a data burst randomizer, the position from which the data has been transmitted is identified from a long code sequence, and the following processes are performed. An error-correction process is applied to the received signal obtained after deinterleaving, by a Viterbi decoder 119. The Viterbi decoder 119 uses an error-correction method in which the likelihood of each receiving path is integrated to obtain a most likely path to identify a transmitted bit sequence. This method is frequently used in radio communications for its high error-correction ability. The received signal which has been error-corrected by the Viterbi decoder 119 is finally checked for the presence of errors by a CRC checker 120, and is transmitted to an upper layer.

Figure 5:
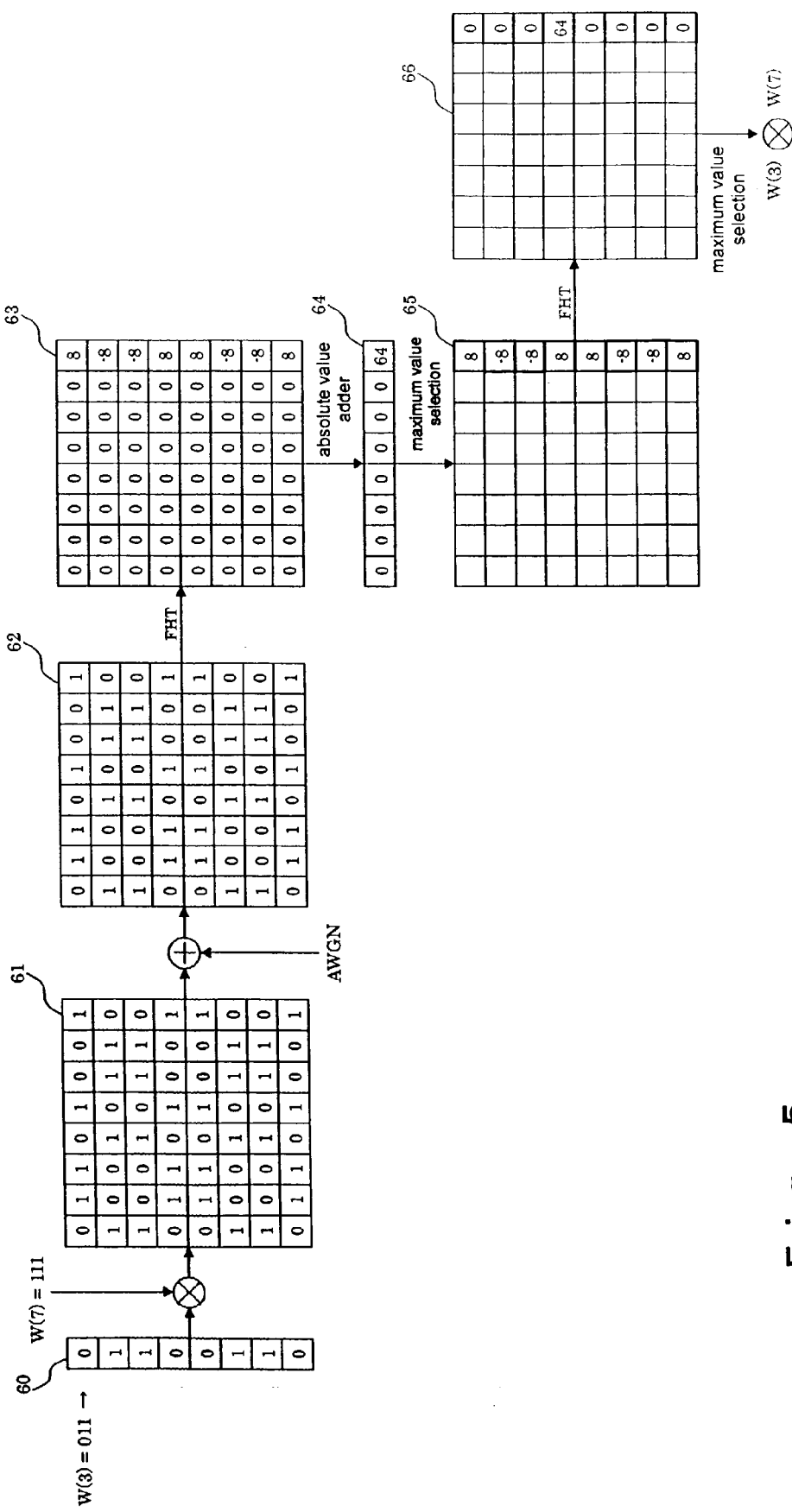
FIG. 5 is a view showing a 64-ary demodulation method in a case in which one Walsh-sequence candidate is selected in the horizontal direction.
Figure 6:
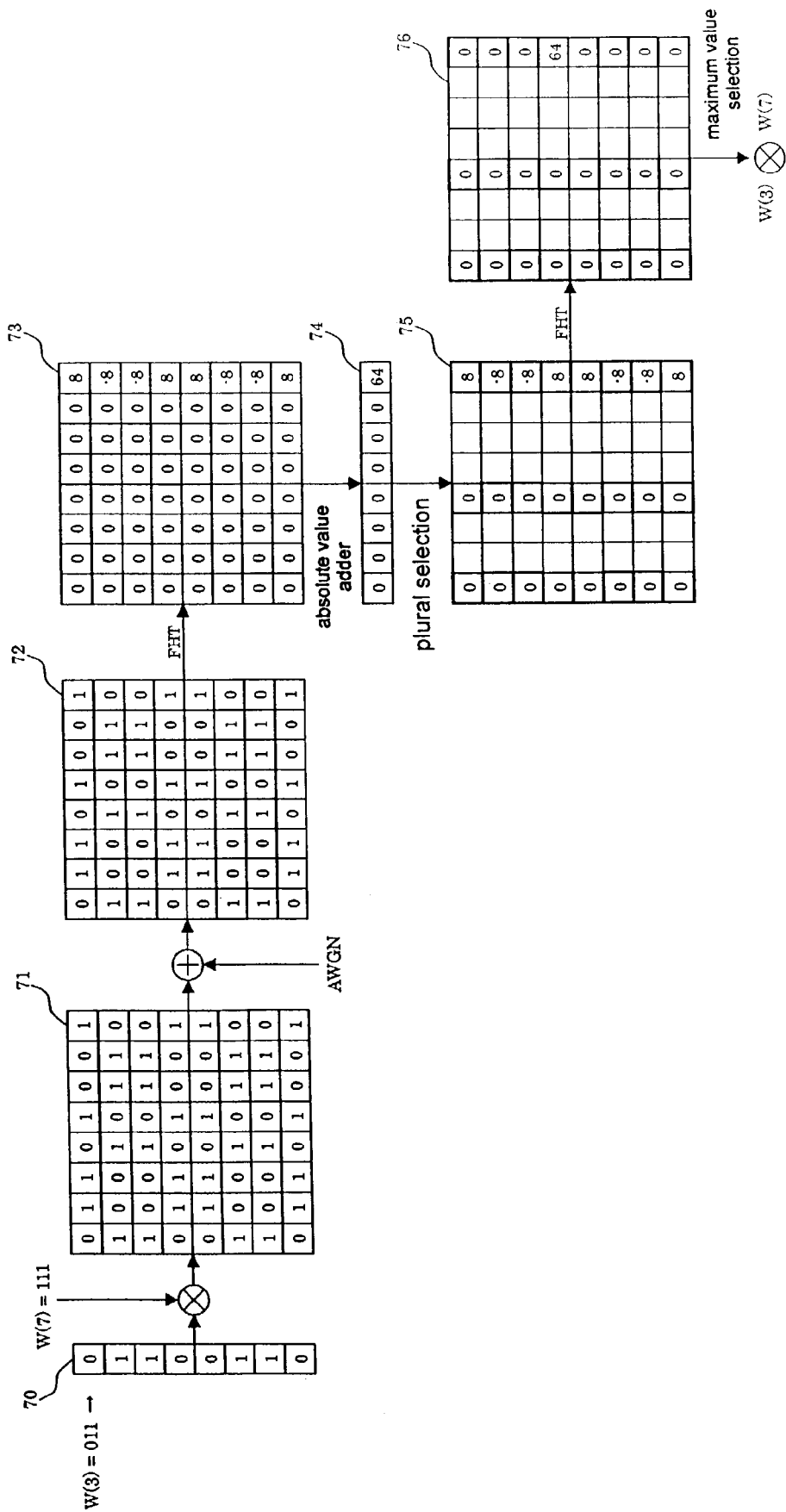
FIG. 6 is a view showing a 64-ary demodulation method in a case in which a plurality of Walsh-sequence candidates are selected in the horizontal direction.
Figure 7:
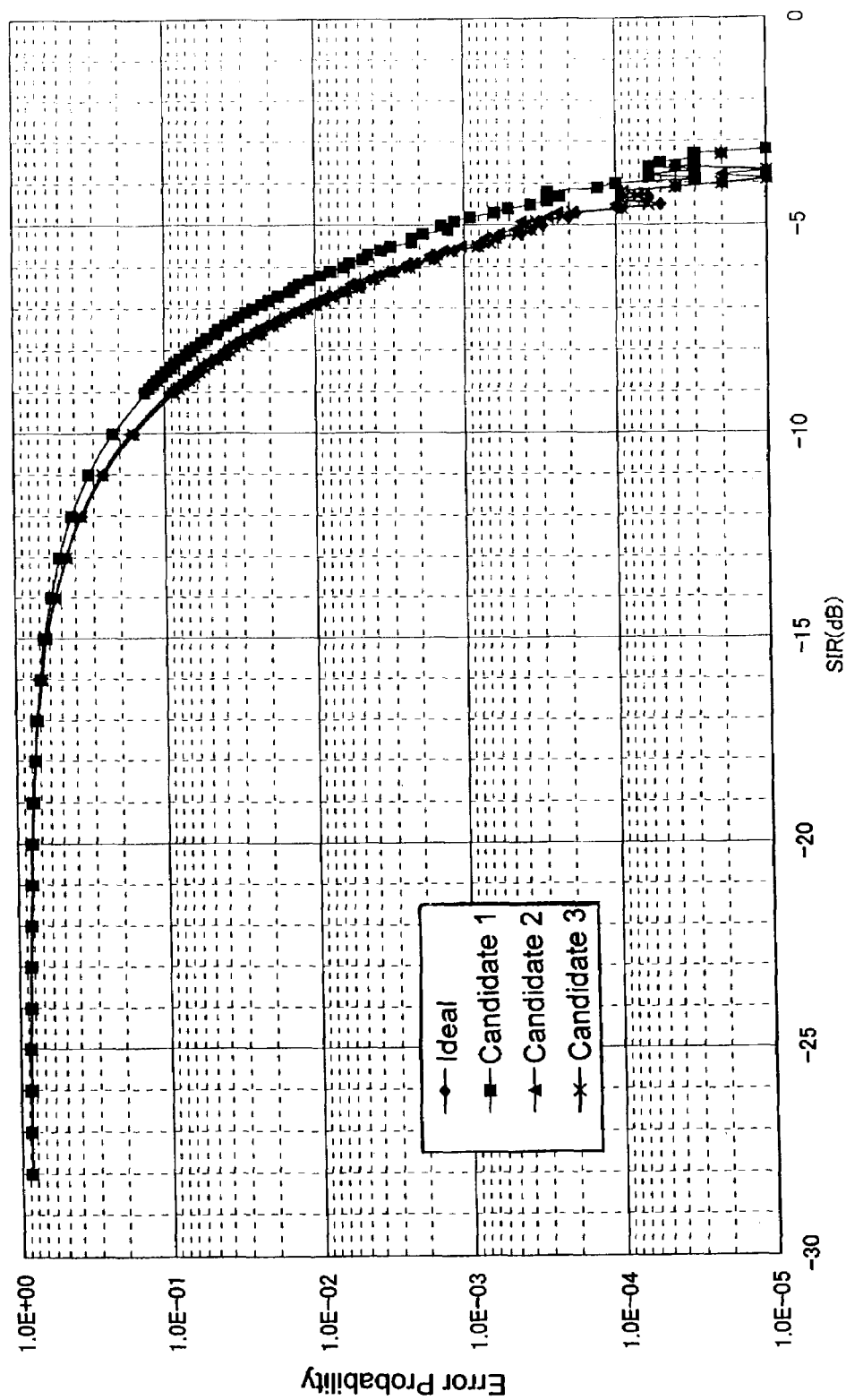
FIG. 7 is a view of the result of simulation of a demodulation characteristic obtained in a case in which the number of Walsh-sequence candidates is changed in the horizontal direction.
Figure 10:
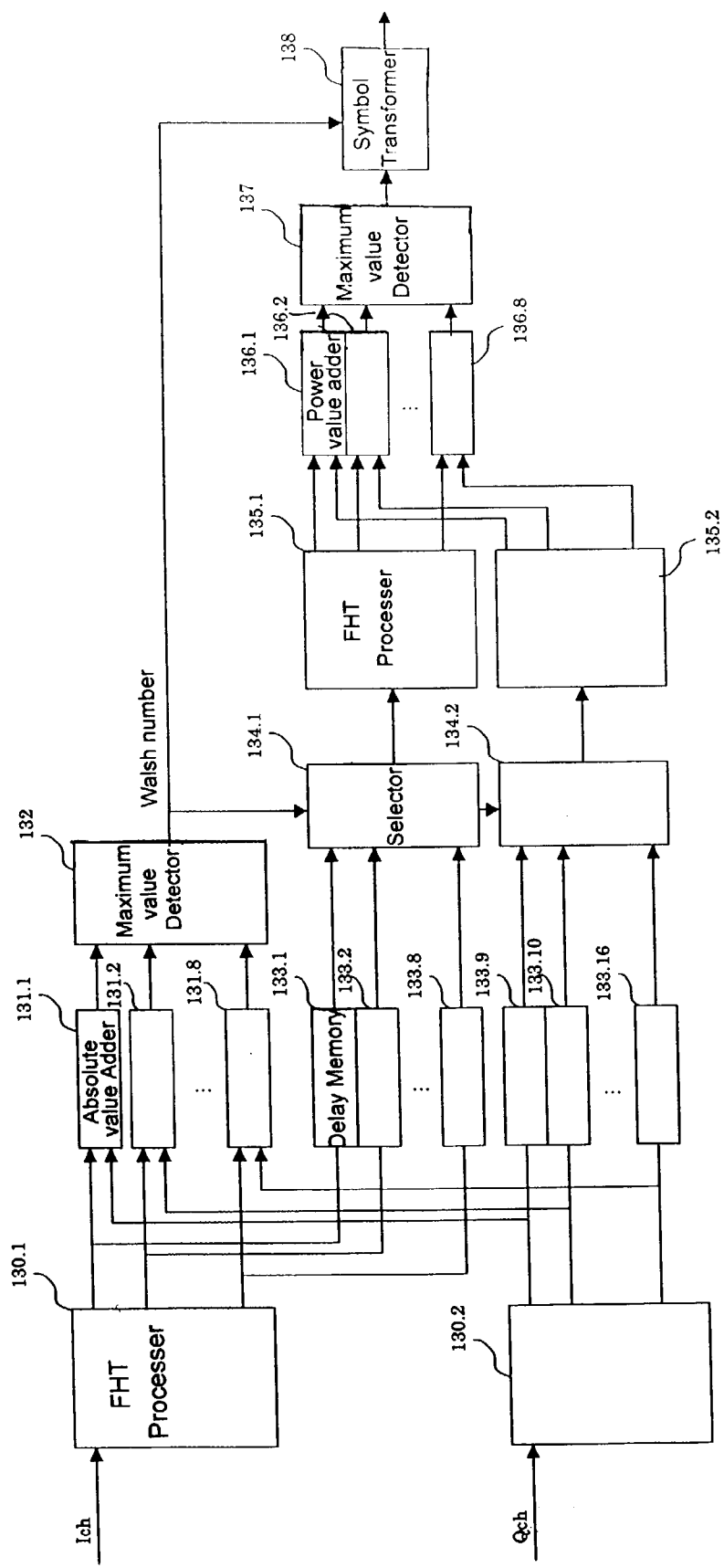
FIG. 10 is a block diagram showing the structure of a 64 chip Walsh demodulator used in a case in which the present invention is applied to IS-95A and one Walsh-sequence candidate is selected in the horizontal direction.

FIG. 10 shows the configuration of a 64 chip Walsh demodulator using the present invention. The principle of the demodulation technique in this configuration is shown in FIG. 5. In FIG. 5, the received signal is regarded as an eight-by-eight two-dimensional array and the FHT process is first applied in the horizontal direction. To perform this process, in the configuration shown in FIG. 10, correlation between the received sequence input to the 64 chip Walsh demodulator and each Walsh code having eight chips is first calculated by FHT processors 130-1 and 130-2 having a code length of eight. In this example, since the Walsh code having a code length of 64 is used, the FHT process for eight chips is repeated eight times. In other words, eight results each obtained by the FHT process for eight chips are output for each Walsh number.

Next, in order to identify a first Walsh sequence, the absolute values of the FHT results for the I and Q channels are added by absolute-value adders 131-1 to 131-8 for each Walsh number. The reason for performing the absolute-value addition is that the signal phase may be negative because of asynchronous detection. This process corresponds to the process of the absolute-value addition in the vertical direction after the FHT process in the horizontal direction in FIG. 5. Since a large correlation value is obtained at a row to which a Walsh number has been applied in the horizontal direction as a result of the FHT process in the horizontal direction, adding the absolute values of the FHT results in the vertical direction identifies the Walsh code applied in the horizontal direction.

In this example, since asynchronous detection is performed, the absolute-value addition is required for both I phase component and Q phase component. Therefore, the absolute value addition process is performed 8*2 (I and Q)=16 times in each absolute value adder. In the results of the absolute-value addition, a Walsh number for which the result of the absolute-value addition is maximized is detected by a maximum value detector 132, and the first Walsh code is identified. Since the correlation value for each Walsh code is obtained by the absolute value adders 131-1 to 131-8, one correlation value is selected from the eight correlation values, obtained in each column. The Walsh number detected by the maximum value detector 132 is used as a selection signal for selectors 134-1 and 134-2.

The FHT process results for the I and Q channels are delayed by delay memories 133-1 to 133-16 until the first Walsh code is identified. Each delay memory is configured so as to store eight data items to store a vertical data sequence in the received signal 63 shown in FIG. 5. When the first Walsh code is identified, only received signals corresponding to the identified Walsh number for the I and Q channels are read out from the delay memories, and are sent through the selectors 134-1 and 134-2, and the FHT process for eight chips is again performed by FHT processors 135-1 and 135-2. In a conventional method, the FHT process is applied to all columns. According to the present invention, however, the FHT process is applied to only one column which has been selected by the first FHT process performed in the horizontal direction, so that the load of the latter-stage FHT process is greatly reduced. The processes hitherto correspond to the processes applied to the received signals 65 and 66 in FIG. 5. In other words, the FHT process is applied to the vertical sequence having a maximum energy selected from the results of the absolute-value additions to obtain the same result as that obtained by the FHT process for 64 chips. Since the FHT processors 135-1 and 135-2 output the results of correlation with a second Walsh code, the sum of squares for each of the I and Q channels for each Walsh number is obtained by power-value adders 136-1 to 136-8 to calculate the receiving energy for each Walsh number. A maximum value detector 137 detects the maximum receiving energy to identify and the second Walsh code. In the maximum value detection process, the maximum value is selected from eight elements corresponding to the length of the second Walsh code. In the conventional process, the maximum value is selected from 64 correlation results obtained after the FHT process for a code length of 64. According to the present invention, however, by dividing the FHT process into two steps, it is necessary for each step to select the maximum value from eight elements in the maximum value detecting process, so that the load of the comparison calculations process can also be greatly reduced.

A symbol transformer 138 finally transforms the first and second identified Walsh numbers into the transmitted symbol, and the 64-ary demodulation process is completed.

According to this configuration, by performing the FHT process in the two steps, the hardware configuration of the FHT processor can be simplified. In particular, as the code length m becomes longer, this advantage becomes more pronounced. For example, in a case in which an the FHT processor having a code length "m" of 256 is used, $256*\log_2 256*2$ (I and Q)=2048 adders/subtracters are required when configured according to the conventional technique. However, according to the present invention, with a Walsh code of m=256 being regarded as a 16-by-16 two-dimensional array, configuration can be realized with $16*\log_2 16*2*2$ (I and Q)=256 adders/subtracters. In practice, the number of peripheral circuits such as absolute value adders and delay memories is slightly increased, however, the reduction in the number of adders/subtracters is effective.

Second Embodiment

Figure 11:
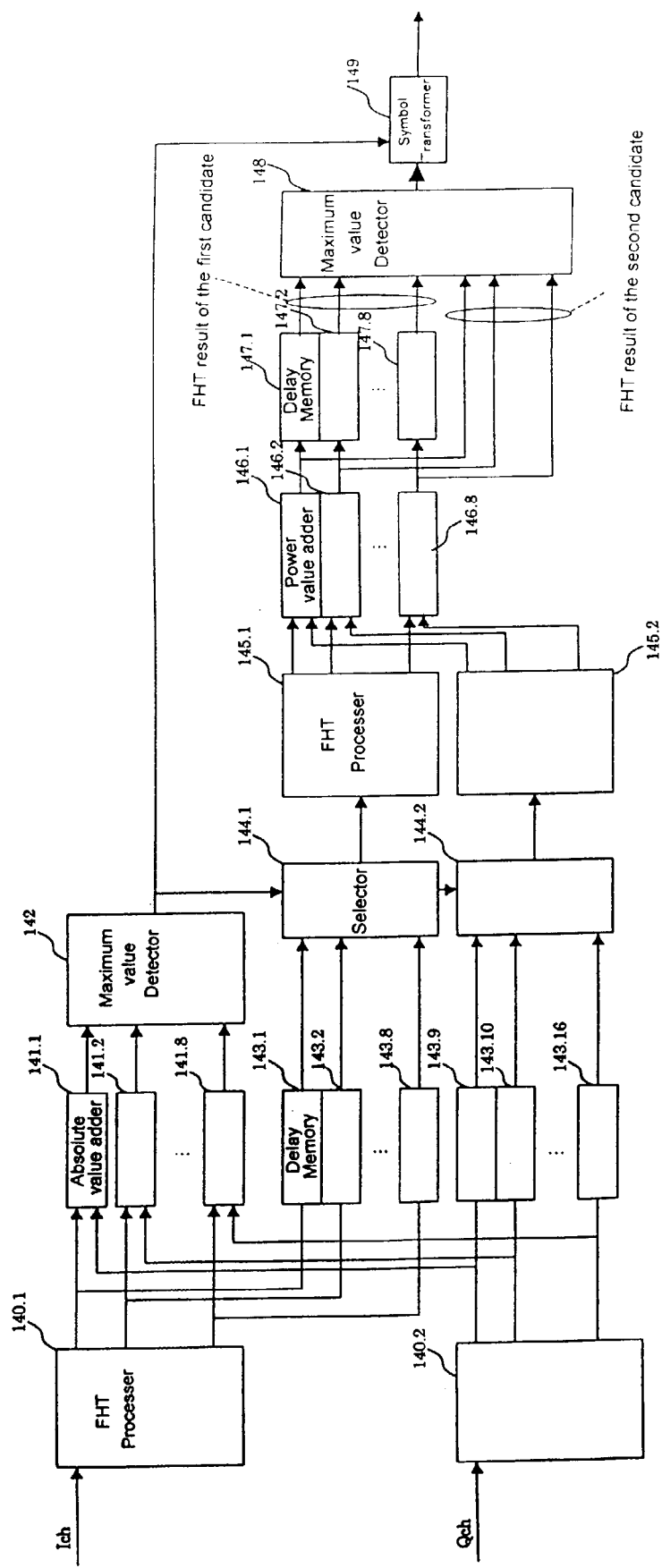
FIG. 11 is a block diagram showing the structure of a 64 chip Walsh demodulator used in a case in which the present invention is applied to IS-95A and two Walsh-sequence candidates are selected in the horizontal direction.

FIG. 11 shows the configuration of a 64 chip Walsh demodulator in a case of selecting two first Walsh code sequences.

To a received signal sequence, the FHT process having a chip length of eight is first applied by FHT processors 140-1 and 140-2, and absolute-value additions are performed by absolute value adders 141-1 to 141-8 for each Walsh number. These are the same processes as in the configuration shown in FIG. 10. The signals for which the absolute-value additions have been performed are input to a maximum value detector 142, and a Walsh code having the maximum power and a Walsh code having the second maximum power are selected to determine two candidates.

In the configuration shown in FIG. 10, only the Walsh code having the highest energy is selected. In the configuration shown in FIG. 11, however, deterioration of the receiving quality is prevented by extending the range of candidates for the first Walsh code.

When the first Walsh-code candidates have been identified, the received sequence of the first candidate is read out from delay memories 143-1 to 143-16, and is sent through selectors 144-1 and 144-2, and the FHT process for eight chips is performed by latter-stage FHT processors 145-1 and 145-2. Then, the sums of squares of the data obtained by the FHT process are obtained for I and Q channels, for each Walsh number by power value adders 146-1 to 146-8, and are temporarily stored in delay memories 147-1 to 147-8. When the processes for the first candidate have been completed, the received sequence of the second candidate is read out from the delay memories 143-1 to 143-16, and the FHT process and the process for obtaining the sum of squares are performed in the same way as for the first candidate.

With the above processes, a process for calculating correlation of the second Walsh code with the first and second candidates is completed. A Walsh number corresponding to the maximum energy is then selected from the total of 16 FHT-process results by a maximum value detector 148. The Walsh number corresponding to the maximum energy is converted to a transmission symbol, and the 64-ary demodulation process is completed.

The example shown in FIG. 11 has a larger amount of processing than that of FIG. 10 because the process for calculating the correlation with the second Walsh code needs to be performed twice that in the case shown in FIG. 10, but it has an advantage of improving its characteristic.

Third Embodiment

Figure 12:
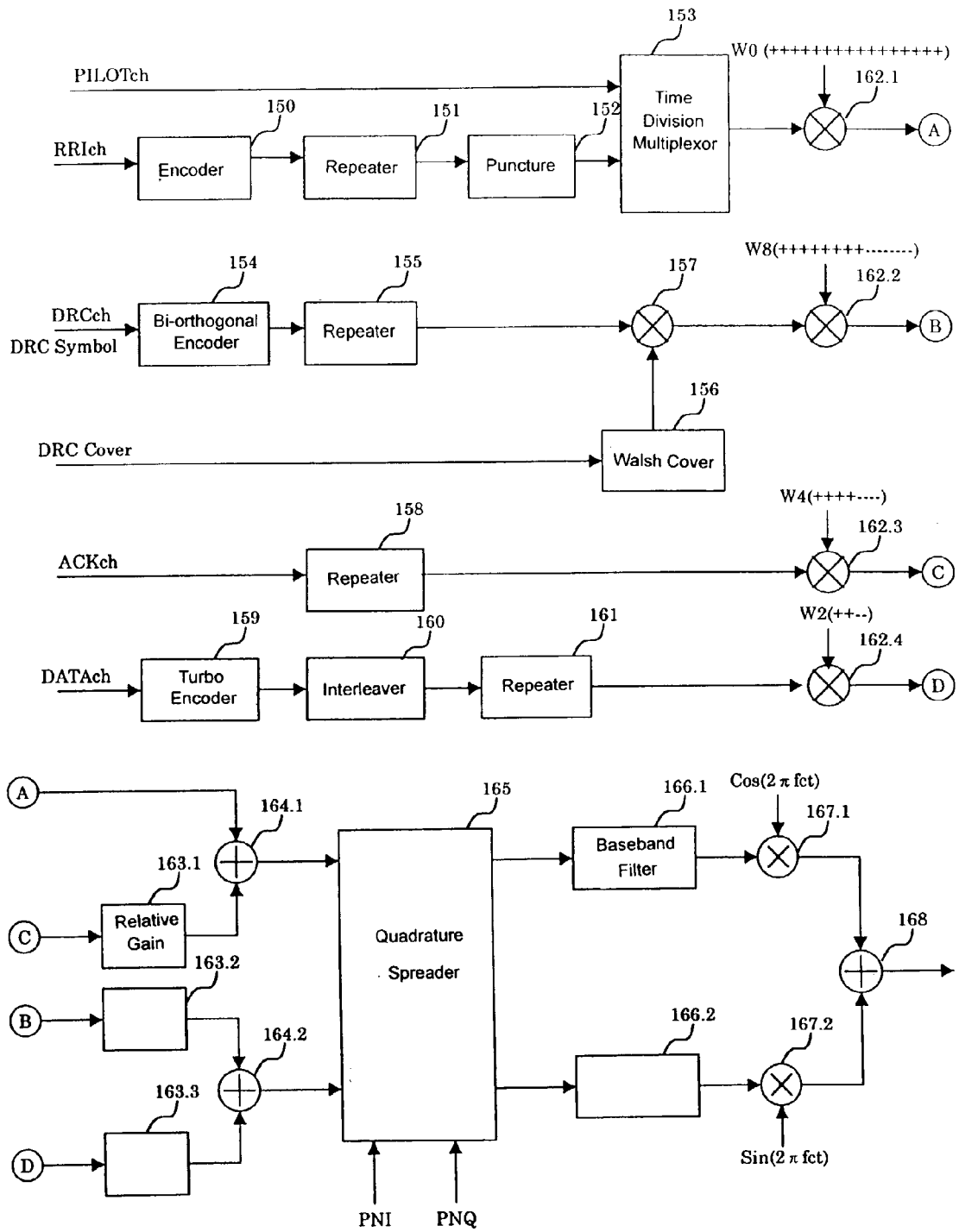
FIG. 12 is a block diagram showing the structure of a transmission system in a mobile station in a reverse link of IS-856.

FIG. 12 shows the configuration of physical channels in a reverse link of 1xEV-DO (IS-856) obtained by using CDMA2000 1x only for data. The IS-856 reverse link includes five physical channels in total, a PILOT channel, a reverse rate indicator (RRI) channel, a data rate control (DRC) channel, an acknowledge (ACK) channel, and a DATA channel. The present invention can be applied to the DRC channel among these channels, in which the modulation process is performed with a Walsh code. The configuration of the DRC channel will be described hereinafter by referring to FIG. 12. The other channels will not be described here since they are not directly related to the present invention.

The DRC channel has an important role in the IS-856 system, which requires a certain base station transceiver subsystem to send a down packet to be received in the next slot, at a certain data rate according to the communication quality of each base station transceiver subsystem from which the terminal is currently receiving data. The required data rate is referred to as DRCSymbol, and the required transmission-source base station transceiver subsystem is referred to as DRCCover.

A transmission process in the DRC channel will be described by referring to FIG. 12.

DRCSymbol for the DRC channel is replaced with a bi-orthogonal code having a code length of eight by a bi-orthogonal encoder 154. The allocation of each DRC-Symbol to a bi-orthogonal code is shown in FIG. 13. Since a bi-orthogonal code is expressed by a Walsh code and its bit inverted code, there are 16 types of bi-orthogonal codes having a code length of eight.

The transmitted data obtained after the bi-orthogonal encoding process is repeated twice by a repeater 155. Since transmitting the same DRCSymbol twice in one slot enables the receiving side to add the same symbol twice to demodulate it, the communication quality is improved. To the data obtained after the repeating process, a spreading process is applied by a Walsh code corresponding to DRCCover in a multiplexer 157. A Walsh code having a code length of eight is used, and the DRCCover value corresponds to the Walsh number. If DRCCover is equal to one, W1 is used as a Walsh code.

In the DRC channel, a Walsh code having a code length of eight corresponding to DRCSymbol and a Walsh code having a code length of eight corresponding to DRCCover are multiplied, thus performing a process equivalent to a process for substantially transmitting a Walsh code having a code length of 64. The signal multiplied by the Walsh code corresponding to DRCCover is further spread by a Walsh code by a multiplexer 162-2. Walsh codes used in multiplexers 162-1 to 162-4 differ from each other. This makes each physical channel have orthogonality so that the channels do not mutually interfere. Signals spread by the Walsh codes different in each channel are given gains for each channel, are divided into I and Q channels, and are code-multiplexed. The PILOT/RRI channel and the ACK channel are allocated to the I channel, and the DRC channel and the DATA channel are allocated to the Q channel.

Subsequent processes are the same as in IS-95A. The signals in the I and Q channels are four-phase-spread with PNI and PNQ in a quadrature spreader 165, components out of the band-are removed by base-band filters 166-1 and 166-2 in the I and Q channels, and the signals are orthogonally modulated by local frequencies Cos(2πfct) and Sin (2πfct), are converted in frequency and amplified in power by a radio frequency block, and are output from an antenna.

Figure 14:
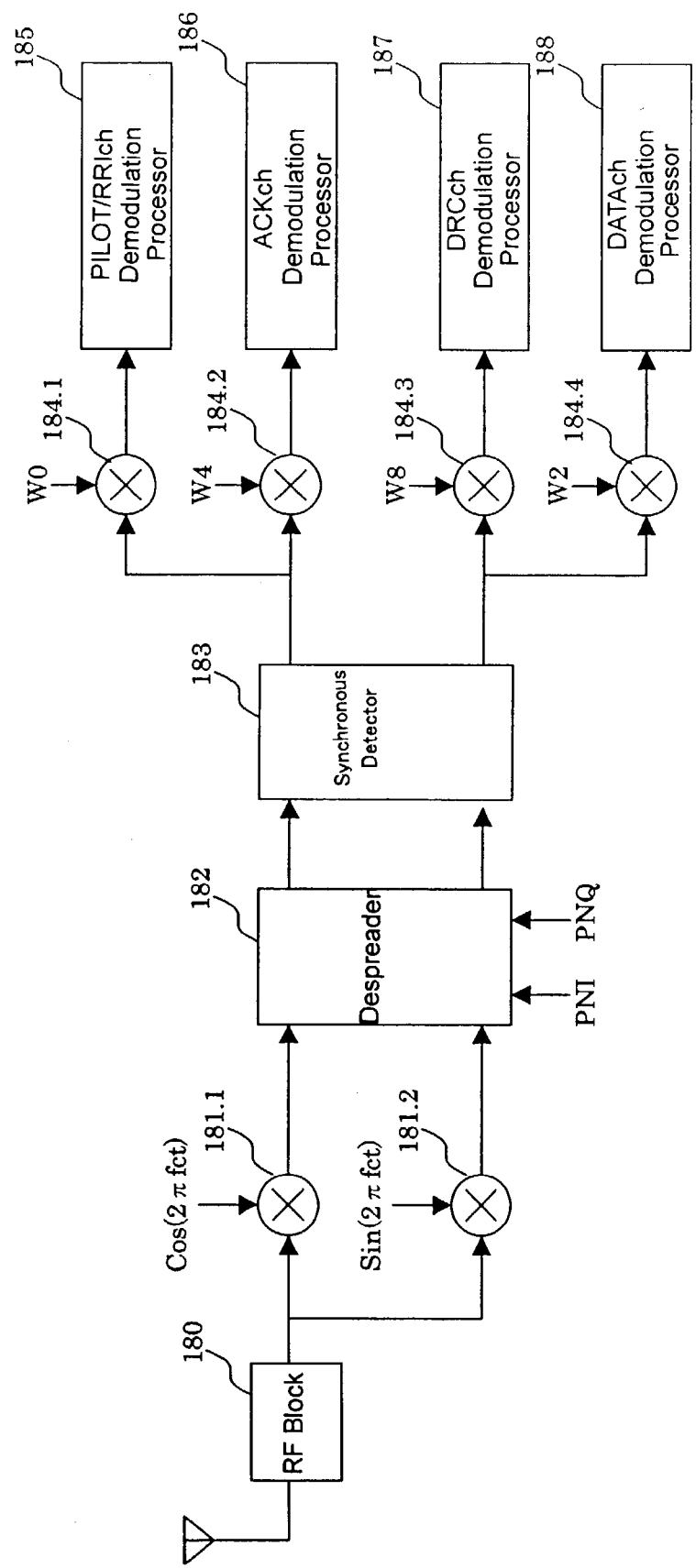
FIG. 14 is a block diagram showing the structure of a receiving system in a base station transceiver subsystem in the reverse link of IS-856.

FIG. 14 shows the configuration of a receiving side in a base station transceiver subsystem, corresponding to the above-described transmission side. A signal received from an antenna is converted in frequency and amplified in power by a radio frequency block 180, and is orthogonally demodulated with the receiving local frequencies Cos(2πfct) and Sin(2πfct) to be converted to base band signals I(t) and Q(t). The base band signals I(t) and Q(t) are despread in a despreader 182 by the spreading codes PNI and PNQ which are the same code sequences as used in the transmission side to be converted back to the pre-spreading signals. To the received signals after despreading, a synchronous detecting process using the PILOT channel is applied by a synchronous detector 183, and the signal phases are converted back to the I axis and the Q axis. In the IS-856, unlike the IS-95A, since a non-modulated PILOT channel is code-multiplexed and transmitted in the reverse link, the current phase can be easily estimated by using the PILOT channel. By applying the process of synchronous detection, the phases in the transmission side and the phases in the receiving side can be matched, so that the PILOT/RRI channel and ACK channel appears on the I channel, and the DRC channel and DATA channel appears on the Q channel. Since these signals have been spread by Walsh codes different in each channel, despreading with the Walsh codes corresponding to the channels in multiplexers 184-1 to 184-4 separates the signals into those in each channel. After that, demodulation processes corresponding to the channels are performed by processor blocks 185 to 188.

Figure 15:
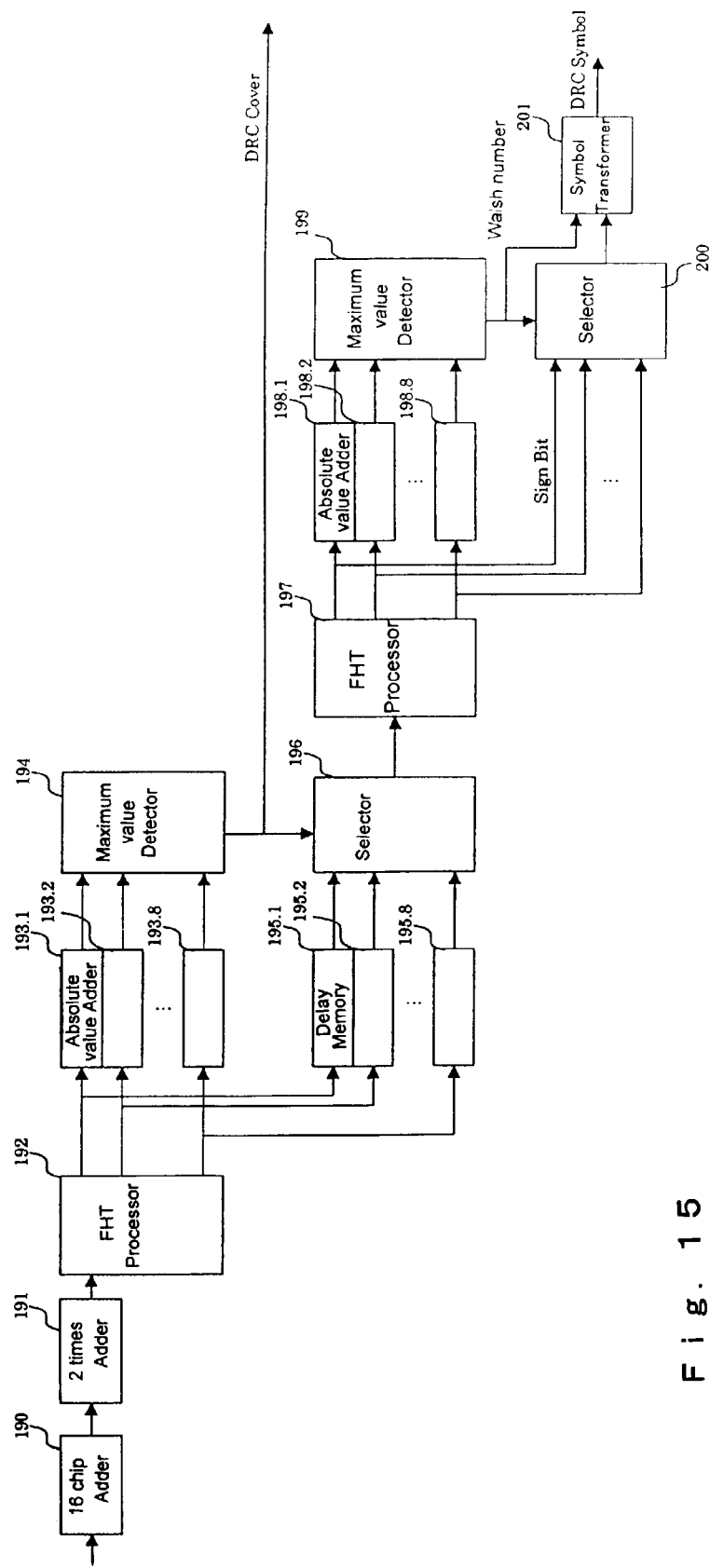
FIG. 15 is a view showing a 64 chip Walsh demodulator method used in a case in which the present invention is applied to IS-856 and one Walsh-sequence candidate is selected in the horizontal direction.

FIG. 15 shows a configuration in a case in which the present invention is applied to a demodulating process for the DRC channel.

Since the spreading process is applied with a Walsh code having a code length of 16 to the DRC channel, after a despreading process with the Walsh code, an addition process for 16 chips is performed by a 16 chip adder 190 to remove correlation with the other channels. The signal obtained after adding 16 chips is processed by a two times adder 191, the signal for 64 chips is stored in a buffer, the signal is added to a signal transmitted the second time, and output to a subsequent stage. As described above in the configuration of the transmission side, since transmissions are performed twice in one slot in the DRC channel, the processing gain can be improved by adding the signals transmitted twice, at the receiving side.

The signal obtained after two additions is divided into units of eight chips, and the FHT process for eight chips is first applied in an FHT processor 192. Further, an absolute-value addition process is applied to correlation results of every eight chips for each Walsh number in absolute value adders 193-1 to 193-8. With this, receiving energy is obtained for each DRCCover. Finding a Walsh number having a maximum absolute-value-addition result by a maximum value detector 194 determines DRCCover of the transmission side.

The output from the FHT processor 192 is temporarily stored in delay memories 195-1 to 195-8 until DRCCover is determined. When DRCCover is determined, data is read out only from a delay memory corresponding to the identified Walsh number, is sent through a selector 196, and the FHT process for eight chips is again performed by a FHT processor 197. This means that a FHT process for 64 chips has been completed together with the former-stage FHT process. Since a bi-orthogonal code is used in an encoding process for DRCSymbol, if DRCSymbol is an odd number, the result of the FHT process for 64 chips becomes negative. Therefore, in order to compare the receiving energy, the outputs from the FHT processor 197 are changed to absolute values by absolute value adders 198-1 to 198-8, and then a Walsh number having the maximum receiving energy is identified by a maximum value detector 199. Then, from the identified Walsh number and the code bit of the receiving energy corresponding to the identified Walsh number, conversion to DRCSymbol is performed.

Modulation techniques for replacing a transmission data sequence with a Walsh code, such as an m-ary modulation technique, require a huge amount of calculation as the Walsh code length increases. According to the present invention, since a Walsh code used in the transmission side is regarded as the product of Walsh codes having a short code length, the amount of calculations can be reduced when the demodulation process is performed by software and the hardware size can be reduced when the demodulation process is performed by hardware. This effect becomes more pronounced as the Walsh code length increases.

Since the same number of modulation processes as the number of terminals in a base station transceiver subsystem is required, if the hardware and software load per terminal is reduced, its effect becomes greater in proportion to the number of terminals which the base station transceiver subsystem handles.

The amount of calculation is reduced, so that a Walsh code having a long code length can be used. In m-ary modulation, when the Walsh code length increases, the processing gain is increased. Therefore, it is expected that the system capacity will be increased.

What is claimed is:

1. A radio receiver in a radio mobile communication system using a code division multiple access (CDMA) communication method, comprising:
    means for calculating a first correlation between a received signal and a plurality of Walsh codes, each Walsh code having a code length of "a", where a Walsh code having a code length of "m" is expressed as the Kronecker product of a Walsh code having a code length of "a" and a Walsh code having a code length of "b", and "a" and "b" satisfy $\log_2 m = \log_2 a + \log_2 b$;
    means for determining a first Walsh code having a code length "a" based on results of absolute-value additions of the first correlations for all Walsh numbers of the Walsh codes;
    means for further calculating a second correlation between the first correlations that corresponds to a Walsh number of the first Walsh code and a plurality of Walsh codes having a code length of "b", to determine a first Walsh code having a code length of "b," and for determining a Walsh code having a code length of "m" based on the first Walsh code having a code length of "a" and the first Walsh code having a code length of "b".

2. A radio receiver according to claim 1, wherein, after correlation with all Walsh codes having a code length of "a" is calculated, a plurality of Walsh-number candidates having a code length of "a" are selected, correlation between each of the correlation results corresponding to the selected Walsh codes and all Walsh codes having a code length of "b" is calculated, and a transmitted Walsh number having a code length of "m" is determined therefrom.

3. A radio receiver according to claim 1, wherein the correlation with respect to the Walsh codes having code lengths of "a" and "b" is calculated by using a fast Hadamard transform.

4. A radio receiver according to claim 2, wherein the correlation with respect to the Walsh codes having code lengths of "a" and "b" is calculated by using a fast Hadamard transform.

5. A radio receiver according to claim 1, wherein a Walsh number having a code length of "a" and a Walsh number having a code length of "b" are determined in a case in which a radio mobile communication system using the code division multiple access transmission method is used, the Walsh code having a code length of "a" and the Walsh code having a code length of "b" are used to decode different received data sequences, and a sequence obtained by the Kronecker product of the Walsh code having a code length of "a" and the Walsh code having a code length of "b" is transmitted.

6. A method for processing a received signal in a radio receiver used in a radio mobile communication system that employs a code division multiple access (CDMA) communication technique, comprising:
   producing a received sequence from the received signal;
   producing a plurality of first correlation values by correlating the received sequence with each of a plurality of Walsh codes that have a code length of "a";
   determining a plurality of absolute-value sums from the first correlation values;
   determining a first Walsh code based on the absolute-value sums, including identifying a selected first correlation value based on the absolute-value sums, the first Walsh code corresponding to the selected first correlation value, the first Walsh code having a code length "a";
   producing a plurality of second correlation values by correlating the selected first correlation value with each of a plurality of Walsh codes that have a code length of "b";
   determining a second Walsh code based on the second correlation values, the second Walsh code having a code length "b"; and
   determining a final Walsh code that has a code length of "m" based on the first Walsh code and on the second correlation values,
   wherein the final Walsh code can be expressed as a Kronecker product of the first Walsh code and the second Walsh code, where "a", "b", and "m" are related by: $\log_2 m = \log_2 a + \log_2 b$.

7. The method of claim 6 further comprising computing a power value corresponding to each of the second correlation values, wherein the final Walsh code is based on a maximum value of the power values.

8. The method of claim 7 wherein the number of power values is "b", wherein "b" is less than "m".

9. The method of claim 6 wherein correlating the received sequence with each Walsh code that has a code length of "a" includes applying a fast Hadamard transform.

10. The method of claim 6 wherein correlating the first Walsh code with each Walsh code that has a code length of "b" includes using a fast Hadamard transform.

11. The method of claim 6 further comprising:
   determining a third Walsh code based on the absolute-value sums, including identifying an additional selected first correlation value based on the absolute-value sums, the third Walsh code corresponding to the additional selected first correlation value, the third Walsh code having a code length "a"; and
   producing a plurality of third correlation values by correlating the additional selected first correlation values corresponding to the third Walsh code with each Walsh code that has a code length of "b",
   wherein the final Walsh code is based on the second and third correlation values.

12. A radio receiver in a radio mobile communication system using a code division multiple access (CDMA) communication method, comprising:
   a first correlator having an input configured to receive a received sequence and having outputs for outputting a plurality of first correlation values, the first correlation values being a result of correlating the received sequence with a plurality of Walsh codes of code length "a";
   an absolute-value adder component having inputs configured to receive the first correlation values and having outputs for outputting a plurality of absolute-value sums, the absolute-value sums being a result of a summation operation performed on the first correlation values;
   a maximum value detector having inputs configured to receive the absolute-value sums and an output for outputting a selection signal, the selection signal determined based on the absolute-value sums;
   a first selector having a first input configured to receive the first correlation values, having a second input configured to receive the selection signal, and having an output for outputting a signal representative of a selected one of the first correlation values, the selected one of the first correlation values being determined by the selection signal;
   a second correlator having an input configured to receive the signal from the selector and having outputs for outputting a plurality of second correlation values; and
   a second selector having inputs for receiving signals based on the second correlation values and having an output for outputting a signal representative of a second Walsh code of code length "b",
   wherein the first Walsh code and the second Walsh code constitute a transmitted Walsh code of code length "m" expressed as a Kronecker product of the first Walsh code and of the second Walsh, where "a", "b", and "m" are related by: $\log_2 m = \log_2 a + \log_2 b$,
   wherein the received sequence is obtained from the transmitted Walsh code.

13. The radio receiver of claim 12 wherein the first correlator and the second correlator, each is a fast Hadamard transformer (FHT).

14. The radio receiver of claim 12 further comprising a power value adder component having inputs configured to receive the second correlation values and having outputs for outputting power values, the inputs of the second selector being coupled to receive the power values.

15. The radio receiver of claim 12 wherein the first correlator comprises a first FHT and a second FHT, the first FHT having inputs configured to receive I-channel sequences and having first outputs, the second FHT having inputs configured to receive Q-channel sequences and having second outputs, the outputs of the first correlator comprising the first outputs and the second outputs.

* * * * *